Dec. 16, 1969 J. V. MASI 3,484,606

RADIATION RESPONSIVE ELECTRICAL DEVICE HAVING AN EXTENDED SPECTRAL RESPONSE CHARACTERISTIC

Filed July 13, 1967 2 Sheets-Sheet 1

INVENTOR.
JAMES V. MASI

BY
MAHONEY, MILLER & RAMBO
BY Wm. V. Miller
ATTORNEYS

INVENTOR.
JAMES V. MASI
BY
MAHONEY, MILLER & RAMBO
BY Wm. V. Miller
ATTORNEYS

United States Patent Office 3,484,606
Patented Dec. 16, 1969

3,484,606

RADIATION RESPONSIVE ELECTRICAL DEVICE HAVING AN EXTENDED SPECTRAL RESPONSE CHARACTERISTIC

James V. Masi, Huntington, N.Y., assignor to Mid-Continent Manufacturing Co., Columbus, Ohio, a corporation of Ohio Filed July 13, 1967, Ser. No. 653,250
Int. Cl. G01n 21/38
U.S. Cl. 250—71 5 Claims

ABSTRACT OF THE DISCLOSURE

Spectral response of a radiation responsive electrical element is extended through conversion of incident radiation wavelengths to radiation wavelengths usable by the electrical element. Wavelength conversion is effected by luminescent material which fluoresces in response to excitation by incident radiation to emit radiation of relatively longer wavelengths that effect a change in the electrical characteristic of the element. The combined effect of wavelength conversion with transmission of radiation of wavelengths to which the electrical element responds extends the spectral response characteristic of the composite electrical device.

Radiation responsive devices, particularly those electrical devices which are responsive to photon energy, generally have a relatively narrow-band spectral response characteristic. Examples of the types of electrical devices to which this invention is directed, although it is to be understood that this invention is not limited to these particular devices, include photoresistors, photodiodes, phototransistors, photomultipliers, and photovoltaic cells. All of these devices have a relatively narrow spectral response characteristic which is determined primarily by the energy gap of the material or by useful exciton levels near the band gap of the material used in the fabrication of these devices. This spectral response characteristic is determined by the particular material and is normally fixed and can be varied only slightly around the peak which is dictated by the specific material. This limitation as to the spectral response characteristics limits the effective application of a specific device to an environment where the incident ambient radiation will be within this narrow spectral response band. Consequently, it has been the practice in accordance with prior art to select a radiation responsive device which has been fabricated from a material having the desired spectral response band for the particular application although the spectral response band may be relatively narrow. A disadvantage of this technique is that the sensitivity of the electrical device to the radiation which it is desired to detect may be relatively low and thus detract from the overall performance of the device. An inherent disadvantage of the prior art devices is the narrow spectral response characteristic which requires the use of several radiation responsive devices having differing spectral response bands to accommodate a situation where the ambient radiation covers a relatively wide wavelength band.

The disadvantages and limitations of the relatively narrow spectral response characteristics of radiation responsive electrical devices is substantially eliminated by this invention. In accordance with this invention, the effectiveness of a specific radiation responsive electrical device element is greatly enhanced through the expansion of the spectral response of the device by providing a luminescent material in radiation coupled relationship to the electrical device. The luminescent material is of a type which is selected to fluoresce and emit radiation within the relatively narrow spectral response band of the electrical device element in response to incident radiation of a relatively shorter wavelength that is absorbed by the luminescent material. This radiation wavelength conversion is in accordance with Stoke's law with respect to a fluorescent type luminescent material. Stoke's law indicates that incident radiation of a relatively short wavelength will excite the material and result in emission of radiation having a wavelength which is relatively longer. In the basic form of this invention, appropriate selection of the radiation responsive electrical device and the luminescent material results in the fabrication of a device which has a wavelength band spectral response which is substantially greater than the spectral response characteristics of the basic electrical device element.

These and other objects and advantages of this invention will be readily apparent from the following detailed description, and the accompanying drawings.

Figure 1:
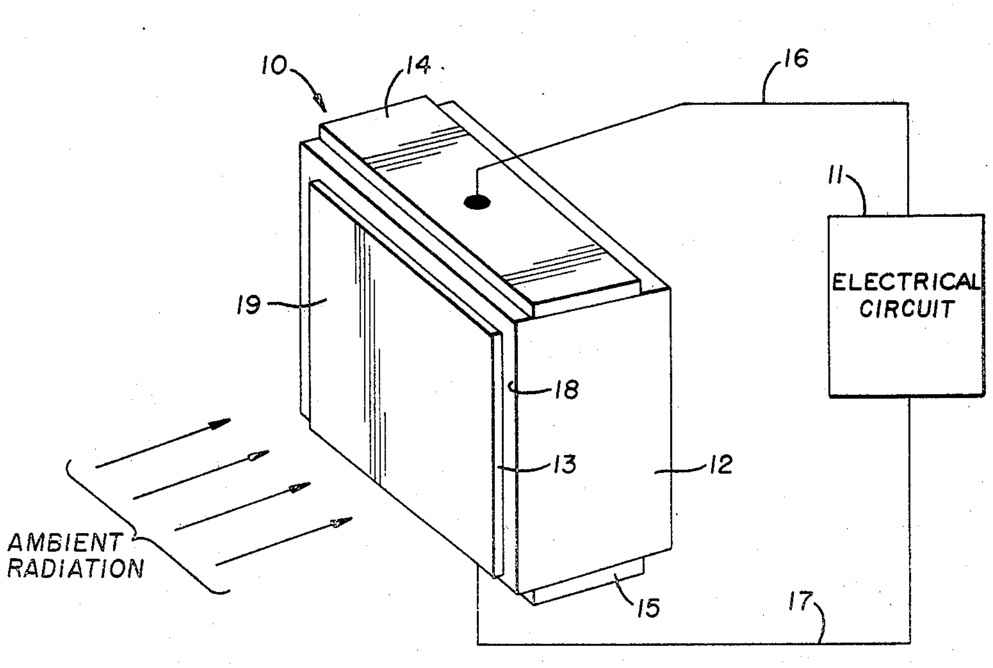
FIGURE 1 is a diagrammatic view in perspective of a radiation responsive electrical device embodying this invention and connected in an electric circuit.

Referring specifically to FIGURE 1, a radiation responsive electrical device indicated generally at 10 and embodying this invention is shown connected in circuit with an external electrical circuit 11. In its most basic form, the radiation responsive electrical device 10 comprises a radiation responsive electrical element 12 and a layer of luminescent material 13. The electrical element 12 is formed from an appropriate material for the particular application which, for example, may be a photoresistor and is formed with an appropriate configuration such as the illustrated block form. A pair of electrical contact plates 14 and 15 are bonded to opposite faces of the electrical element block in electrical contact and each plate is connected in circuit with the electrical circuit 11 by the conductors 16 and 17. A surface 18 of the electrical element 12, which may be termed the active receptor surface, is designed to receive incident radiation and the electrical characteristics of the element will thereby be modified by such incident radiation. In this photoresistor example, the resistance characteristics of the element will be dependent on the incident radiation and a variation in the incident radiation will thus effect a change in the electric circuit as a consequence of the photoresistance element.

Formed on the surface 18 is a layer of luminescent material 13 which is selected to fluoresce and emit radiation in the wavelength band of the spectral response characteristic of the electrical element 12 when excited by radiation of a relatively shorter wavelength. With the luminescent material 13 thus formed on the receptor surface 18 of the electrical element 12, the incident ambient radiation will be first intercepted by the luminescent material and radiation of wavelengths in the spectral band which are absorbed by the luminescent material will result in excitation and fluorescence of this material to emit radiation in the relatively longer wavelength bands within the spectral response band of the electrical element.

Figure 2:
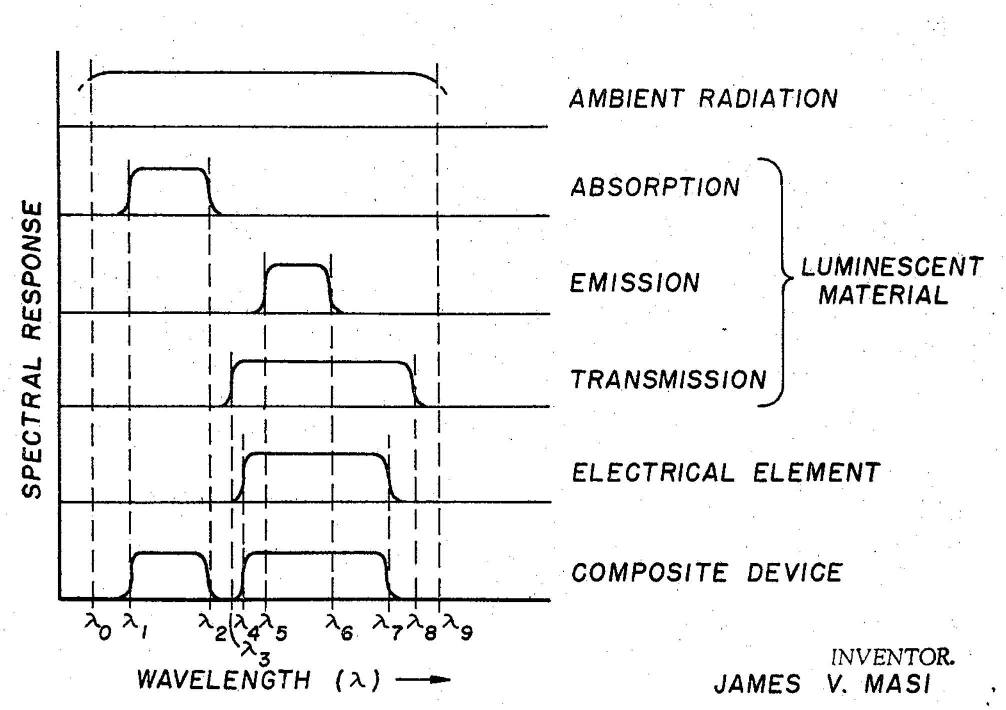
FIGURE 2 is a graphical representation of the spectral response characteristics of the elements of the device shown in FIGURE 1.

A further characteristic of luminescent materials which fluoresce is that these materials are also normally transmissive of radiation within a spectral band which includes the emitted radiation. Since the electrical element 12 is also selected to have a spectral response within this emitted radiation band of the luminescent material, the effectiveness of the device will be enhanced since the radiation which is received by the electrical element will include not only that radiation within the absorption band of the luminescent material but the radiation of wavelengths within the transmission and emission wavelength band of this luminescent material. These spectral response characteristics of the electrical element 12 and luminescent material 13 are graphically presented in FIGURE 2. In this graph, the horizontal axis indicates the relative wavelength with the wavelength increasing to the right while the vertical axis provides a relative indication of the spectral response. The uppermost curve indicates that the ambient radiation comprises a spectrum having wavelengths from $\lambda_0$–$\lambda_9$. This is considered to be a relatively broad spectrum for the purposes of this example and it will be noted from the curve representing the response of the electrical element that only a portion of this spectrum could be directly utilized by the electrical element itself. The response characteristic of the electrical element is indicated in FIGURE 2 as comprising the wavelength region $\lambda_4$ through $\lambda_7$. Thus, it will be readily seen that the electrical element by itself would be responsive to only a portion of the ambient radiation spectrum. The spectral response is enhanced through the application and utilization of a layer of luminescent material 13 which, in the present example, is indicated to have the spectral response characteristics indicated by the second, third and fourth waveforms beneath the ambient radiation waveform of FIGURE 2. It will be seen that this luminescent material has an absorption characteristic which covers the wavelength band $\lambda_1$ through $\lambda_2$ and in response to excitation of radiation of this wavelength spectrum will emit radiation in a wavelength spectrum extending from $\lambda_5$–$\lambda_6$. Selection of the luminescent material and electrical elements are correlated so that the emission spectral band $\lambda_5$ through $\lambda_6$ will be within the spectral response region $\lambda_4$–$\lambda_7$ of the electrical element. As previously indicated, a luminescent material which fluoresces normally has a radiation transmission characteristic which includes the fluorescent emission spectrum and may, as in this example, extend from $\lambda_3$ through $\lambda_8$. It will be noted here that this transmission spectrum is inclusive of the response spectrum $\lambda_4$–$\lambda_7$ of the electrical element. As a result of fabricating the electrical device in accordance with this invention to include the radiation responsive electrical element 12 and the layer of luminescent material 13, an electrical device is provided having a composite spectral response which is substantially greater than that experienced through the utilization of a radiation responsive electrical element by itself. This composite spectral response is graphically illustrated by the lowermost waveform of FIGURE 2 and is seen to comprise the two spectrum bands $\lambda_1$–$\lambda_2$ and $\lambda_4$–$\lambda_7$.

While the composite spectrum response is shown as consisting of two discrete spectrum bands, it will be understood that the selection of the electrical element 12 and luminescent material 13 will be determined by the specific spectrum wavelengths of the particular application and that for any particular example, the spectral response may consist of two or more discrete wavelength bands or, through appropriate selection of the materials and the particular application, a composite spectral response may be a continuous band. It will also be understood that the graphical representation of FIGURE 2 has been optimized to illustrate relatively sharp cut-off points and a relatively flat response with respect to each of the radiation bands. Such optimum characteristics may not be experienced in a practical application; however, the principle of this invention will be applicable to a practical device fabricated through appropriate selection of the materials for the electrical element 12 and the luminescent material 13.

As a specific example, the luminescent material 13 may be formed as a thin transparent film of fluorescent materials in an ionic solution in a plastic matrix and formed on the receptor surface 18 of the electrical element 12. This transparency of the thin film will enhance the radiation transmission characteristics of the luminescent material. A practical application lies in the matching of a silicon solar cell through the solar radiation spectrum. The device may be constructed by forming a saturated fluorescent red dye on the active surface of a silicon solar cell. The radiation peak of solar radiation is in the order of 550 microns while the peak response spectrum of the silicon solar cell is in the region of wavelengths greater than 600 microns. Although the solar radiation peak is of the order of 550 microns, there will be radiation within the range to which the silicon solar cell will respond but the level of radiation is substantially lower and may be of the order of 50% of the peak value. Through utilization of a layer of luminescent material having appropriate characteristics, the peak radiation wavelength is converted from 550 microns to approximately 620 microns. The result is a substantial increase in the relative spectral response from the previous 50% to the order of 80%.

Figure 3:
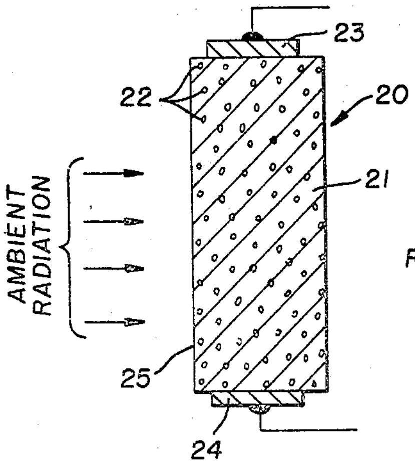
FIGURE 3 is a medial vertical sectional view of a radiation responsive electrical device of modified construction.

A modification of the basic configuration of a radiation response electrical device constructed in accordance with this invention is illustrated in FIGURE 3. In this modification, the particles of luminescent material are directly mixed in or embedded in the material forming the radiation responsive electrical element. An electrical element formed from a suitable material to provide the desired electrical characteristic is fabricated with the luminescent material particles 22 embedded therein. Electrical contact plates 23 and 24 are bonded to opposite end faces of the electrical element for connection with an external electrical circuit (not shown). A receptor surface 25 of the device exposed to ambient radiation will permit excitation of the luminescent material particles 22 to emit radiation in the spectral response band of the electrical element material 21. An advantage of this construction is that the efficiency of the device will be enhanced through reduction in loss of radiation through transmission to ambient surroundings.

Figure 4:
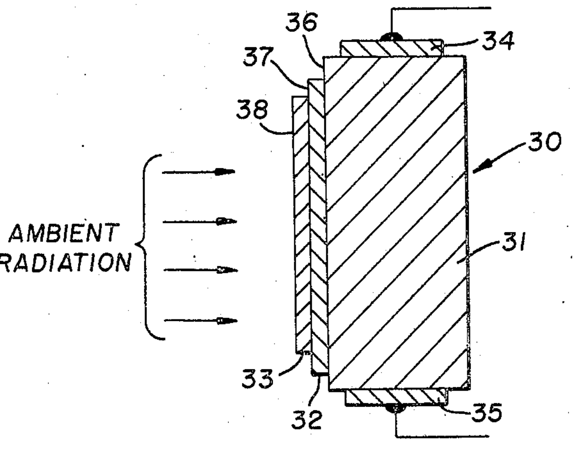
FIGURE 4 is a medial vertical sectional view of a radiation responsive electrical device of further modified construction.
Figure 5:
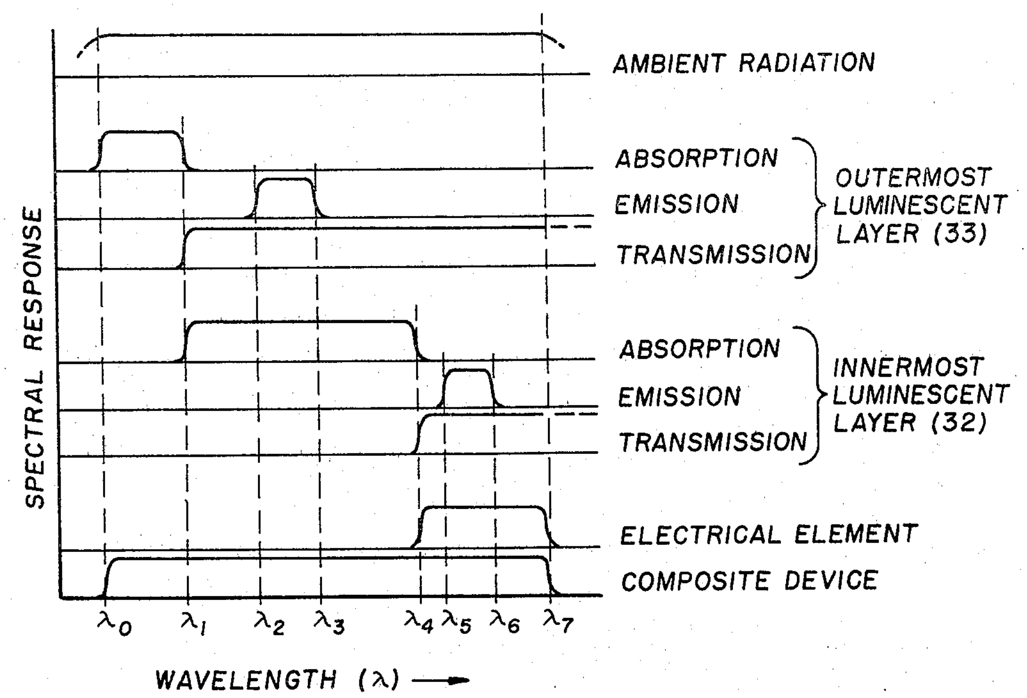
FIGURE 5 is a graphical representation of the spectral response characteristics of the several elements of the device shown in FIGURE 4.

A further modification of the radiation responsive electrical device is shown in FIGURE 4. In this modification, the device 30 comprises a radiation responsive electrical element 31 and two discrete layers of luminescent material 32 and 33. Electrical contact plates 34 and 35 are bonded to opposed end faces of the electrical element 31 for connection with an external electrical circuit (not shown). One layer of the luminescent material 32 is formed on active or receptor surface 36 of the electrical element 31. The second layer of luminescent material 33 is subsequently formed on a receptor surface 37 of the first layer of luminescent material 32. As in the basic form of the invention described in conjunction with FIGURE 1, each layer of luminescent material 32 and 33 is formed from a material which will fluoresce when excited by radiation incident on the active surface thereof and within a predetermined wavelength spectrum to emit radiation within a second wavelength spectrum. In the device of FIGURE 4, the outermost laper of luminescent material 33 is selected to emit radiation within the wavelength spectrum that will excite the next adjacent layer of luminescent material 32. This second or inner layer of luminescent material 32 is selected to emit radiation within a wavelength spectrum which includes the spectra response range of the electrical element 31. This cascade effect is graphically illustrated in FIGURE 5. In this example, which is graphically optimized for purposes of illustration, the ambient radiation is considered to comprise the wavelength spectrum $\lambda_0$ through $\lambda_7$. The outermost layer of luminescent material 33 is selected to have an absorption characteristic which covers the spectrum $\lambda_0$–$\lambda_1$ and will emit radiation in a spectrum $\lambda_1$–$\lambda_3$. Again it will be noted that the luminescent material will transmit substantially all radiation which is not absorbed and which is of a relatively longer wavelength than that absorbed.

It will be noted that the emission spectrum, in this example, covers the spectrum $\lambda_2$–$\lambda_3$ and that the spectral response characteristic of the electrical element 31 does not include this emission spectrum. Consequently, such emitted radiation of the outermost layer of luminescent material 33 would be ineffective in producing a response in the electrical element 31. The inclusion of the second layer of luminescent material 32, which is interposed between the outer luminescent layer 33 and the electrical element 31, is selected to convert radiation of wavelengths including the emission characteristic spectrum of the outer luminescent layer to radiation of a wavelength to which the electrical element will respond. Accordingly, it will be noted that the absorption spectrum of the luminescent layer 32 extends from $\lambda_1$–$\lambda_4$. This absorption spectrum includes the emitted radiation spectrum of the outermost luminescent layer 33 which is the result of excitation of the previously emitted radiation and transmitted radiation. This absorption of radiation will result in excitation of the inner luminescent layer 32 to emit radiation which may be within the wavelength spectrum $\lambda_5$ through $\lambda_6$. It will also be noted that the inner luminescent layer 32 will transmit radiation of longer wavelengths than that absorbed and which includes the emitted radiation spectrum. Thus, through two successive steps, the relatively short wavelengths of the ambient radiation are converted to the longer wavelengths that will effect a response in the electrical element 31. As a consequence, the device 30, as shown in FIGURE 4, will have the composite response characteristic which covers the broad spectral response $\lambda_0$ through $\lambda_7$ which is identical with the ambient radiation in this optimized example.

It will be readily apparent from the foregoing detailed description that radiation responsive electrical devices constructed in accordance with this invention are capable of providing a broad spectral response. Increasing the spectral response of electrical devices having characteristically narrow spectral response regions further increases the applications and usefulness of such devices. By utilizing the principles of this invention, it is possible to construct electrical devices having optimum electrical characteristics for a particular application. Although the electrical element may have a limited spectral response which is not optimum for the ambient radiation, incorporation of a luminescent material which is selected for optimum spectral characteristics relative to the ambient radiation thus forms a composite device having the desired spectral response characteristic.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A radiation responsive electrical device comprising:

(A) an electrical element material having a radiation responsive electrical characteristic and being responsive to incident radiation within a first wavelength spectrum, and (B) a luminescent material having a fluorescent characteristic such that radiation of wavelengths within an emission spectrum which is within said first wavelength spectrum is emitted when said luminescent material is excited by incident radiation of relatively shorter wavelengths within a second wavelength spectrum, said luminescent material being transmissive of radiation within a wavelength spectrum which includes said first wavelength spectrum and being disposed in radiation coupled relationship to said electrical element material.

2. A device according to claim 1 wherein said electrical element material is formed into a structurally integral body having a radiation receptor surface and said luminescent material is formed in a layer superposed on said receptor surface, said layer of luminescent material having a surface exposed to incident radiation.

3. A device according to claim 2 which includes a second layer of luminescent material juxtaposed to said first layer in superposed relationship to the exposed surface thereof, said second layer of luminescent material having a fluorescent characteristic such that radiation of wavelengths within said second wavelength spectrum is emitted in response to excitation by radiation of relatively shorter wavelengths within a third wavelength spectrum, said second layer of luminescent material also being transmissive of radiation within a wavelength spectrum which includes said first and second wavelength spectrums.

4. A device according to claim 3 wherein said first, second and third wavelength spectrums are adjacent and contiguous forming a single, continuous spectral response characteristic.

5. A device according to claim 1 wherein said first and second wavelength spectrums are adjacent and contiguous forming a single, continuous spectral response characteristic.

References Cited

UNITED STATES PATENTS

| | | | |
|---|---|---|---|
| 2,765,411 | 10/1956 | Kerr | 250—71 |
| 2,884,529 | 4/1959 | Eggler et al. | 250—71.5 |
| 2,899,560 | 8/1959 | Nemet | 250—71.5 |

ARCHIE R. BORCHELT, Primary Examiner

U.S. Cl. X.R.

250—71.5, 211, 216